Feb. 25, 1958 J. L. DUNN 2,824,958
ELECTRONIC PULSE DECODER
Filed Nov. 26, 1952
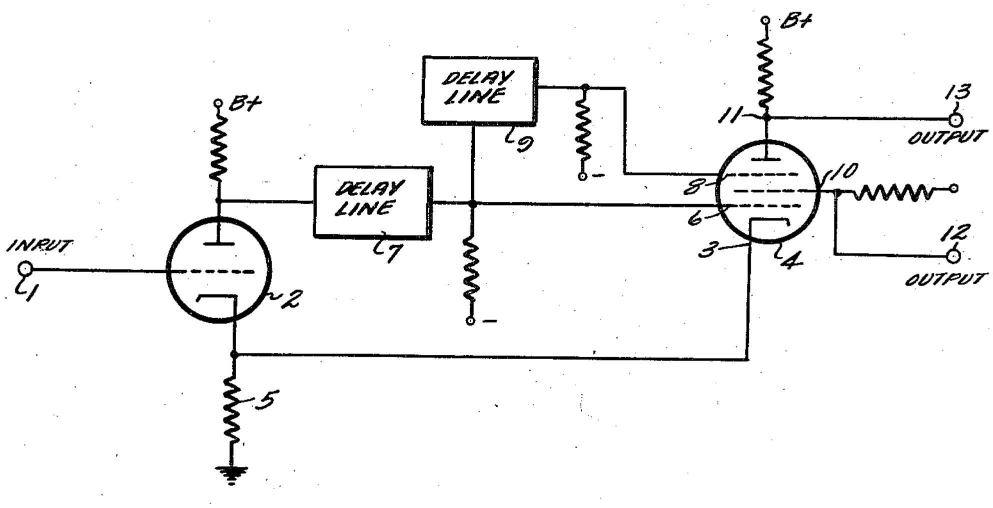
INVENTOR.
JENUS L. DUNN
BY Theodore C. Wood
AGENT—
Nader Koontz
ATTORNEY—

United States Patent Office 2,824,958

Patented Feb. 25, 1958

2,824,958

ELECTRONIC PULSE DECODER

Jenus Lamar Dunn, Tonawanda, N. Y., assignor to the United States of America as represented by the Secretary of the Air Force Application November 26, 1952, Serial No. 322,782

1 Claim. (Cl. 250—27)

This invention relates to electronic pulse decoding circuits and more particularly to a switching pulse producing circuit which will produce a switching pulse at one of its outputs provided that two pulses spaced in time by a predetermined amount has been received at its input and which will produce another switching pulse at another of its outputs provided that three pulses spaced in time by a predetermined amount has been received at its input.

In certain types of remote control systems, the control signals are transmitted over the same channel by using pulse discrimination. In that type of control system one command function may be represented by two pulses spaced in time, while another function is represented by three pulses spaced in time. An example of a coding circuit for producing that type of pulse discrimination is illustrated and described in copending application Serial Number 320,506, filed November 14, 1952, by Jenus L. Dunn, entitled "Electronic Pulse Coder." Although the switching pulse producing circuit of this invention is particularly well suited for use at the receiving end of such a type of control system, it is by no means limited to use in such a system, since it will also find use in other types of control systems, for example, in that type of system known as "pulse proportional system." In that last mentioned type system, the number of pulses determine the particular channel to be "opened" for additional incoming control information.

It is an object of this invention to provide a switching pulse producing circuit which will accurately distinguish between a two pulse and a three pulse input.

The above object, as well as other objects, features and advantages of this invention will be more readily understood in view of the following description when taken in conjunction with the attached drawing wherein the single figure is a simplified schematic diagram of a switching pulse producing circuit constructed in accordance with the principles of this invention.

Referring now to the drawing, signal input 1 is applied to the control grid of tube 2. A first output of tube 2 is applied to the cathode 3 of tube 4 by having the cathode of tube 2 and the cathode of tube 4 use a common resistor 5. Another output of tube 2 is taken from the anode circuit and is applied to the grid 6 of tube 4 through a delay line 7. The output of delay line 7 is also applied to grid 8 of tube 4 through another delay line 9. Grid 10 of tube 4 is used as an output electrode for the first output 12 and the anode 11 is used as another output electrode for the second output 13.

Assume now a signal consisting of three pulses uniformly spaced by a predetermined amount of time is applied to input 1. The first pulse causes a drop in potential across resistor 5 thus lowering the potential on cathode 3 of tube 4. Tube 4 is normally nonconducting by virtue of the negative biasing potential applied to grids 6 and 8 and even with the negative signal on its cathode the tube will not conduct unless simultaneously a signal appears on grid 6 which will then permit current to flow to output grid 10 and if a signal is also present at the same time on grid 8, then current will also flow to anode 11. The receipt of the first pulse of the three pulse signal will produce no output at either of the output terminals 12 or 13. The receipt of the second pulse of the three pulse signal will again produce a negative signal on the cathode 3 of tube 4, however at the same time the first pulse output of tube 2 having been delayed by delay line 7 is now present on grid 6 of tube 4 and now current will flow from cathode 3 to grid output electrode 10 resulting in a negative output signal at output 12. At that time however, the grid 8 of tube 4 is still biased to such a potential that no current will flow from cathode 3 to anode 11 and therefore no output will appear at output 13. The receipt of the third pulse of the three pulse signal will again cause a negative signal to appear on cathode 3 of tube 4 and since at that time the second pulse output of tube 2 which has been delayed in delay line 7 now is present upon grid 6, current will flow from cathode 3 to grid output electrode 10 and an output pulse will appear at output 12. At that same time the first pulse of the three pulse signal is present on grid 8 since it has been delayed by delay lines 7 and 9 and therefore current will flow from cathode 3 to anode 11 which will result in an output pulse at output 13.

Assume now a signal consisting of two pulses spaced a predetermined amount of time is applied to input 1. The first pulse of the two pulse signal will cause a negative pulse to be present on cathode 3 of tube 4, however grid 6 and grid 8 are still biased to such a value as to prevent cathode current from flowing and therefore no output will be present at outputs 12 and 13. The receipt of the second pulse of the two pulse signal will again cause a negative signal to be applied to cathode 3 of tube 4 however, at this time the first pulse output of tube 2 which has been delayed by delay line 6 is now present on grid 6 and therefore causes current to flow from cathode 3 to output grid 10 resulting in a negative output pulse at output 12. Since at that time grid 8 is still biased to cut-off, no current will flow from cathode 3 to anode 11 and therefore no output pulse will be present at output 13.

Tube 4 has been shown and described as being of the pentode type however, it will be understood that such a showing is merely by way of example and other types of tubes for example, pentagrid type of tube may be used.

What is claimed is:

An electronic pulse decoder comprising means to produce a first series of pulses having a negative polarity and a second series of pulses occurring at the same time as the first series of pulses and having a positive polarity, an electron discharge device having a cathode, a plate, a first control grid, an anode grid and a second control grid, said grids being situated between said cathode and plate such that the electron flow from said cathode to said plate passes through said first control grid, said anode grid and said second control grid in succession in the order named, means to apply said first series of pulses to said cathode of said electron discharge device, means to bias said first control grid and said second control grid with potentials having sufficient magnitude to prevent current from flowing from said cathode to said anode grid and said plate even though said first series of negative pulses are applied to said cathode, means to delay said second series of pulses by a predetermined amount of time and said second series of pulses by an amount equal to twice said predetermined amount of time, means to apply said second series of pulses which have been delayed by said predetermined amount to said first control grid and to apply said second series of pulses which have been delayed by twice that predetermined amount to said second control grid, said pulses applied to said first control grid and said second control grid having an amplitude sufficient to cause current to flow to said anode grid and said plate provided said first series of pulses are present on said cathode whereby when said first series of pulses and said second series of pulses have a repetition period equal to said predetermined amount of time and said series includes two pulses a single pulse will appear at said anode grid and when said first series of pulses and said second series of pulses have a pulse repetition period equal to said predetermined amount of time and include three pulses a single pulse will appear at said plate.

References Cited in the file of this patent

UNITED STATES PATENTS

| | | |
|---|---|---|
| 2,648,766 | Eberhard | Aug. 11, 1953 |
| 2,683,802 | Williams et al. | July 13, 1954 |
| 2,706,810 | Jacobsen | Apr. 19, 1955 |

FOREIGN PATENTS

| | | |
|---|---|---|
| 624,561 | Great Britain | June 13, 1949 |